United States Patent

[11] 3,598,504

| [72] | Inventor | Vincent F. Siravo |
| | | 20 Limerick Place, Hazlet, N.J. 07730 |
| [21] | Appl. No. | 872,236 |
| [22] | Filed | Oct. 29, 1969 |
| [45] | Patented | Aug. 10, 1971 |

[54] SELF-REGULATING ASPIRATOR
6 Claims, 4 Drawing Figs.

[52] U.S. Cl. ................................................ 417/184, 417/191
[51] Int. Cl. .................................................. F04f 5/48
[50] Field of Search .......................................... 40/184, 179, 183, 197, 191, 198, 151

[56] References Cited
UNITED STATES PATENTS
| 571,692 | 11/1896 | Schneible | 417/184 |
| 2,975,958 | 3/1961 | Kane | 417/179 |
| 3,158,314 | 11/1964 | Young et al. | 417/191 X |
| 3,460,746 | 8/1969 | Green et al. | 417/179 X |

Primary Examiner—Carlton R. Croyle
Assistant Examiner—R. E. Gluck
Attorney—Frank Makara ABSTRACT: This invention relates to a self-regulating device for inflating emergency survival equipment such as is used on airplanes and it uses highly compressed air from a tank to entrain a large amount of atmospheric air to increase the volume of the inflation air obtainable only from the tank. The device comprises a cylindrical housing having a valve seat therein, a centrally disposed outlet conduit of unique construction for emission of the compressed gas from the tank, and a coacting spring-loaded piston also of unique construction and adapted to engage said valve seat of said housing to seal off the fully inflated equipment from the atmosphere.

PATENTED AUG 10 1971 3,598,504

SELF-REGULATING ASPIRATOR

It is an object of this invention to provide an aspirator device that will inflate a flexible bag emergency survival equipment to a much greater volume at atmospheric pressure than what is obtainable from the compressed air of the tank itself.

It is another object to provide a device that is self opening under the high pressure of compressed gas and which is self closing when the pressure of the compressed gas is reduced to substantially that of atmospheric pressure, thereby sealing off the inflated equipment from the atmosphere.

Figure 1:
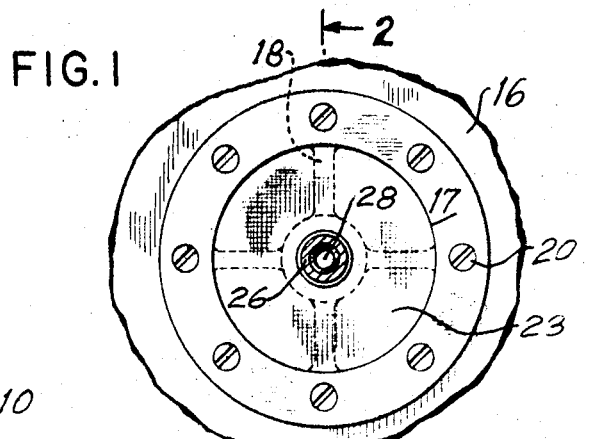
Figure 2:
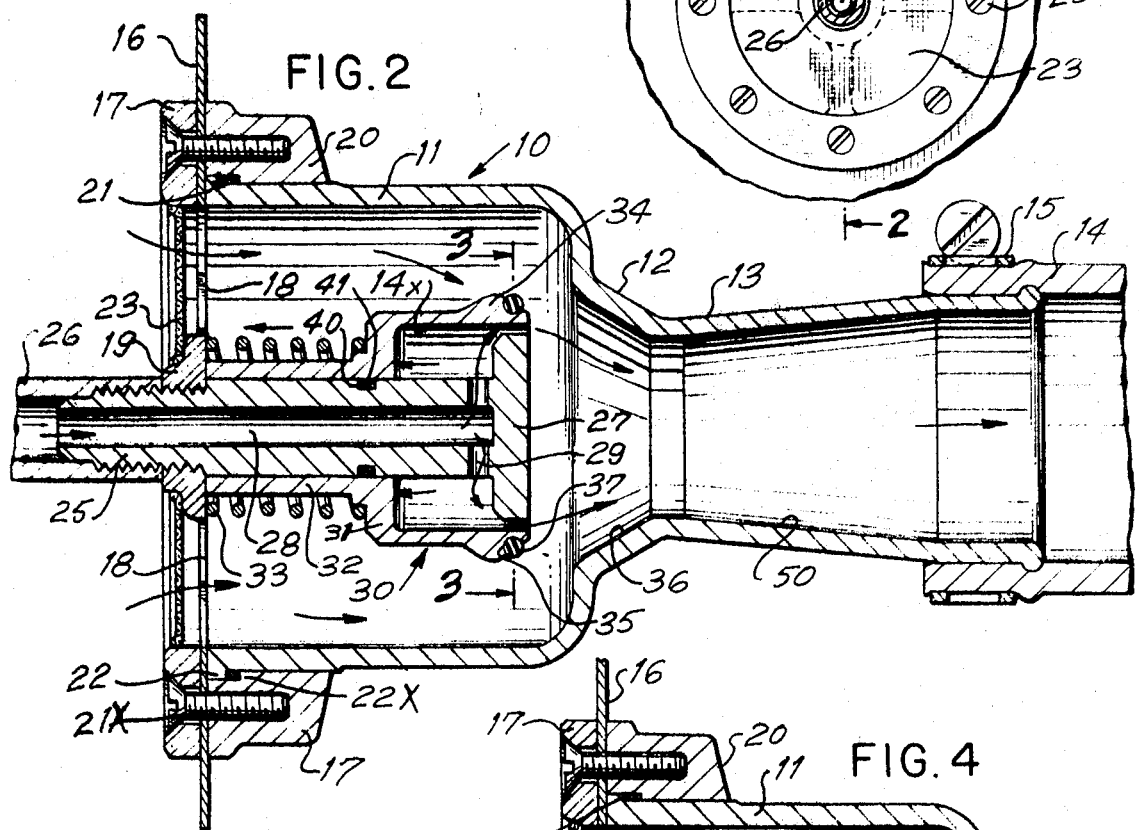

These and other objects of this invention will become apparent upon reading the following disclosure of an illustrated embodiment shown in the accompanying drawing in which, FIG. 1 is a front view of the aspirator disposed in a wall of the survival equipment, FIG. 2 is a section view taken on line 2-2 of FIG. 1 and exhibiting the details of the cylindrical aspirator; showing the centrally disposed fixed outlet conduit for high pressure gas with its enlarged solid round head portion, the spring-loaded piston disposed around said outlet conduit when under high pressure actuation, and showing the valve seat of the housing against which the piston is seated when not actuated by high pressure gas.

Figure 3:
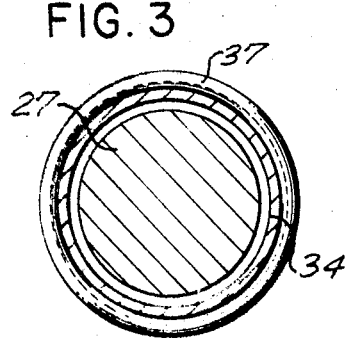
Figure 4:
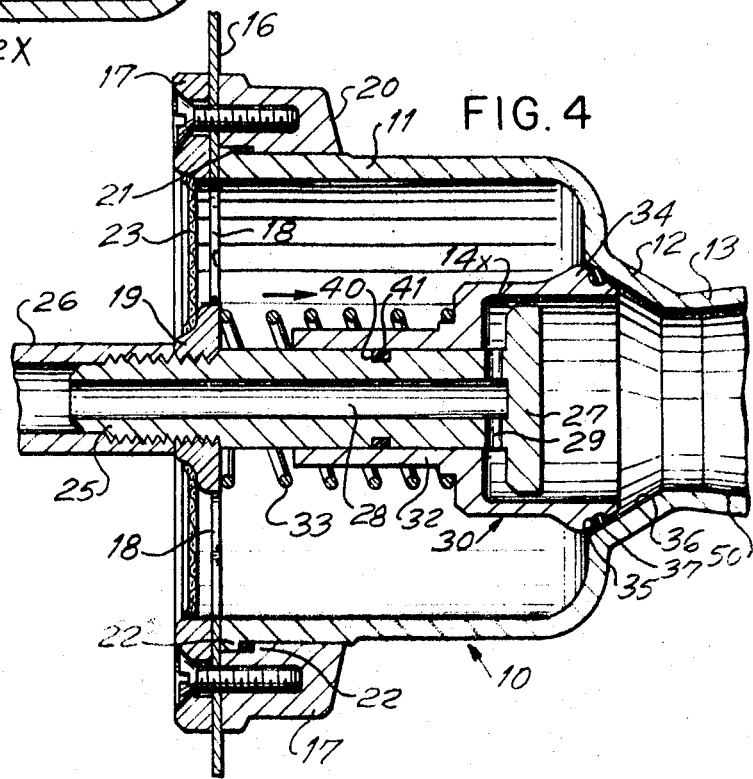

FIG. 3 is a section view taken on line 3-3 of FIG. 2 showing the annular opening through which the compressed gas or air rushes in operable position, FIG. 4 is a view similar to that of FIG. 2, showing the aspirator valve in valve closed position when an inflation procedure is fully performed.

In summation, the device of this invention is a combined aspirator and valve of unique construction and function. The device sucks in air, preferably in the ratio of four parts atmospheric air to one part tank air, by entrainment of atmospheric air. Moreover, because of the spring-loaded piston operable only by high pressure gas, the device functions as a closure valve upon decrease of the high pressure of the compressed gas to substantially the pressure of the atmosphere, thereby closing off communication of the air in the inflated equipment from the atmosphere.

Turning to the drawing, an integral tubular housing 10 is provided with cuplike top portion 11, a middle conical valve seat portion 12, and a bottom venturi throat portion 13.

The bottom portion 13 is secured to a flexible plastic or rubber hose 14 by use of a conventional hose clamp 15. The aspirator and its hose 14 or, for example about one foot or more in length, is disposed inside the flotation bag wall 16.

The aspirator is secured to the flotation bag wall 16 by use of a suitably apertured bonnet 17 having quadrant arms 18 and a threaded aperture hub 19. An annular collar 20 having a plurality of threaded cavities therein to mate with the apertures of bonnet 17, is slidably disposed over cup-shaped portion 11 of the housing. The wall 16 of the inflatable bag is provided with a plurality of apertures to mate with the apertures of the bonnet 17 and the threaded cavities of collar 20. Bolts 21X are disposed through said bonnet 17 and said wall 16 apertures into respective cavities of collar 20 to thereby hermetically seal the aspirator to the survival equipment.

The lip of the cup-shaped portion 11 is provided with a lip flange 22 to coact with a corresponding flange 22X on the collar 20. An O-ring 21 hermetically seals the bonnet flange 22 to the collar flange 22X.

A circular screen 23 is press-fitted over the arms 18 of bonnet 17 in order to screen out debris from atmospheric air being sucked into the survival equipment during the inflation procedure.

A suitably threaded post 25 is threaded into the aperture of hub 19 of bonnet 17 to extend exteriorly of the bag wall 16 and a pipe 26 is secured hermetically thereto. The pipe 26 communicates with a reservoir tank of high pressure or compressed air (not shown). The post 25 is provided with a circular integral headplate 27 of predetermined critical radius. The borehole 28 of tube 26 terminates in a plurality of perpendicularly disposed outlet ports 29 located immediately behind headplate 27.

An integral tubular piston 30 is provided with a cylindrical cup-shaped portion 31 of large diameter integral with an extension portion 32 having an inner diameter such as to slidably engage the exterior diameter of the stationary post 25.

A suitable compression spring 33 is disposed against hub 19 and piston portion 31 so as to continuously urge the piston away from the hub. The piston portion 31 is provided with a circular sloped lip 34 having an annular channel 35 therein, in which a sealer rubber O-ring 37 is captively disposed.

The slope of the piston lip 34 is substantially that of the middle valve seat portion 12, so that in valve closed position (FIG. 4) the coil spring 30 produces a leak-proof seal between O-ring 37 and the inner sloped wall 36 of said middle portion 12. The post 25 is also provided with an annular channel 40 and a rubber sealer O-ring 41 is disposed therein to prevent loss of gas back pressure between the piston 30 and said post 25.

As shown in FIGS. 2 and 4, the diameter of the headplate 27 is disposed in an annular relationship to the diameter of the interior cylindrical wall 14X of piston portion 31.

In the normal or inoperative position (FIG. 4), the piston 30 through O-ring 37 engages the housing valve seat portion 12 in a hermetic manner, with the post outlet ports 29 in air communication with the inner cylindrical wall 14X of the piston portion 31 and thus to the interior space of housing portions 12 and 13 and the inside space of the flotation bag formed from a continuous bag wall 16.

Upon release of the high pressure compressed air in the tank, the air rushes down pipe 26 and into borehole 28 of post 25 and out through outlet ports 29 and through the annular channel located between the headplate 27 and the piston inner wall 14X of piston 30.

Because of the difference in the radius between that of the headplate 27 and the radius of the post 25, and annular area of back pressure is created which forces the spring 33 to be compressed together so that the piston 30 and its O-ring move away from the slope wall 26 of the stationary housing portion 12, as shown in FIG. 2.

To assist the suction effect of the compressed air in entraining atmospheric air, preferably, the housing outlet portion 13 is provided with a diffuser conical angular wall 50 to produce a venturi type of suction effect due to expanding comingled air therein.

When the high pressure in the reservoir tank falls to a critical low pressure, it no longer can maintain the spring 33 in its compressed condition, and thus maintain the piston 30 in its open position (FIG. 2). Consequently, automatically the spring 33 forces the piston 30 into valve closed position (FIG. 4), thereby producing a leak-proof seal between the O-ring 37 and the housing 10 to prevent loss of air from within the bag wall 16 to the atmosphere outside the bag wall.

I claim:

1. A compressed air actuated aspirator for entraining atmospheric air comprising a housing having a front cup-shaped portion, a middle sloped valve seat portion and a rear outlet portion; bonnet means engaging said housing front portion for securing said housing to an inflatable bag wall; a tubular post disposed within said cup-shaped housing portion and fixedly secured to said bonnet means and having a solid round headplate; a tubular cylindrical piston having a large diameter cup-shaped portion disposed in critical predetermined annular relationship around said headplate, said large diameter cup-shaped portion having a valve lip adapted to engage said valve seat portion of said housing; and spring means engaging said piston and said bonnet means for continuously urging said piston into valve closure relationship to said housing.

2. The aspirator of claim 1 wherein said housing is an integral unit and said outlet portion is provided with a conical sloped wall to produce a venturi suction effect.

3. The aspirator of claim 2 wherein the tubular post is provided with a plurality of outlet ports immediately behind said headplate.

4. The aspirator of claim 3 wherein said spring means is a compression spring.

5. The aspirator of claim 4 wherein said bonnet means comprises an integral circular plate having an outer rim portion having a plurality of suitably spaced-apart apertures, a plurality of integral spaced-apart arms and an integral hub adapted to fixedly receive said post; and a circular collar having a plurality of suitably spaced-apart threaded cavities slidably mounted over said cup-shaped housing portion whereby a suitably apertured inflatable bag wall is hermetically bolted between said circular plate and said collar.

6. The aspirator of claim 5 wherein said valve lip of said cup-shaped piston portion is provided with a circular channel and an O-ring is disposed therein to produce an air leak-proof seal to the sloped valve seat wall of said housing.